US011558756B2

(12) United States Patent
Abedini et al.

(10) Patent No.: US 11,558,756 B2
(45) Date of Patent: Jan. 17, 2023

(54) NULL-FORMING BASED ON A SELF-INTERFERENCE MEASUREMENT CONFIGURATION

(71) Applicant: QUALCOMM Incorporated, San Diego, CA (US)

(72) Inventors: Navid Abedini, Basking Ridge, NJ (US); Qian Zhang, Basking Ridge, NJ (US); Kapil Gulati, Belle Mead, NJ (US); Yan Zhou, San Diego, CA (US); Andrzej Partyka, Bedminster, NJ (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/236,875

(22) Filed: Apr. 21, 2021

(65) Prior Publication Data

US 2021/0385667 A1  Dec. 9, 2021

Related U.S. Application Data

(60) Provisional application No. 63/036,137, filed on Jun. 8, 2020.

(51) Int. Cl.
*H04W 16/28* (2009.01)
*H04W 24/08* (2009.01)
*H04B 1/3827* (2015.01)

(52) U.S. Cl.
CPC .......... *H04W 16/28* (2013.01); *H04B 1/3827* (2013.01); *H04W 24/08* (2013.01)

(58) Field of Classification Search
CPC .... H04W 16/28; H04W 24/08; H04B 1/3827; H04B 7/0848; H04B 7/086; H04B 7/0617; H04B 7/063
See application file for complete search history.

(56) References Cited

U.S. PATENT DOCUMENTS

| 2014/0133411 | A1* | 5/2014 | Park | H04L 5/0058 370/329 |
| 2016/0127024 | A1 | 5/2016 | Morita | |
| 2021/0126669 | A1* | 4/2021 | Roberts | H04L 5/0023 |
| 2021/0258100 | A1* | 8/2021 | Hassan | H04W 72/1257 |
| 2022/0182160 | A1* | 6/2022 | Su | H04L 5/14 |

FOREIGN PATENT DOCUMENTS

EP    2577875 B1    4/2016

OTHER PUBLICATIONS

International Search Report and Written Opinion—PCT/US2021/034743—ISA/EPO—Sep. 6, 2021.

* cited by examiner

*Primary Examiner* — Ashley Shivers
(74) *Attorney, Agent, or Firm* — MG-IP Law, P.C.

(57) ABSTRACT

In an aspect, a network device (e.g., BS, core network component, etc.) determines a self-interference measurement (SIM) configuration associated with null-forming at a wireless device (e.g., UE or BS), the null-forming associated with steering at least one receive beam of the wireless device and/or at least one transmit beam of the wireless device away from one or more external sources of self-interference. The network device transmits the SIM configuration to the wireless device. The wireless device performs at least one null-forming procedure in accordance with the SIM configuration.

30 Claims, 9 Drawing Sheets

NULL-FORMING BASED ON A SELF-INTERFERENCE MEASUREMENT CONFIGURATION

CROSS-REFERENCE TO RELATED APPLICATION

The present application for patent claims the benefit of U.S. Provisional Application No. 63/036,137, entitled "NULL-FORMING BASED ON SELF-INTERFERENCE MEASUREMENT CONFIGURATION", filed Jun. 8, 2020, assigned to the assignee hereof and hereby expressly incorporated by reference herein in its entirety.

BACKGROUND OF THE DISCLOSURE

1. Field of the Disclosure

Aspects of the present disclosure relate generally to wireless communication systems, and more particularly, to interference mitigation. Certain aspects of the technology discussed below can enable and provide null-forming (e.g., steering at least one receive beam of the first wireless device and/or at least one transmit beam away from one or more external sources of self-interference, e.g., clutter) based on a self-interference measurement (SIM) configuration.

2. Description of the Related Art

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various null-forming procedures may be performed, including receive null-forming procedures (e.g., transmission beam is fixed and repeated, and multiple receive beams associated with a prior receive beam are used for measurements), transmit null-forming procedures (e.g., multiple transmit beams associated with a prior transmit beam are used, and receive beam is fixed and repeated), joint transmit and receive null-forming procedures (e.g., transmission and measurements over multiple self-interference (SI) resources with different choices of transmit and receive beams associated with, e.g., spatially QCL'd, with a pair of prior transmit and receive beams), or iterative null-forming procedures (e.g., start with a receive or transmit null-forming procedure, and then switch to the other null-forming procedure type, if needed).

In some conventional wireless devices, as a baseline, for any beam, multiple spatially QCL'ed beams with different null-forming (e.g., suppression of different side-lobes and the amount of suppression) are pre-configured and stored at the wireless device. The wireless device has to go over the list and do measurements to find a good candidate. In some designs, multiple beams can be created on-the-fly and based on the prior measurements. In other designs, the wireless device may have performed prior measurements (e.g., detecting clutters, their directions and strengths), and may utilize this information to find/create a proper null-forming configuration.

Aspects of the disclosure are directed to communicating a self-interference measurement (SIM) configuration to a wireless device, in contrast to the wireless device implementing a pre-stored SIM configuration or its own autonomous and dynamically configured (i.e., on the fly) SIM configuration. Such an implementation may provide various technical advantages, including more precise null-forming, faster null-forming, network-coordinated null forming (e.g., so transmission part of null forming procedures can be monitored by other wireless entities, for positioning, power control, etc.), and so on.

In an aspect of the disclosure, a method, a computer-readable medium, and an apparatus are provided. The apparatus may be a wireless device (e.g., a UE or BS). The wireless device may receive an indication of a self-interference measurement (SIM) configuration associated with null-forming at the first wireless device, the null-forming associated with steering at least one receive beam of the first wireless device, at least one transmit beam of the first wireless device, or a combination thereof, away from one or more external sources of self-interference, and may perform at least one null-forming procedure in accordance with the SIM configuration.

In an aspect of the disclosure, a method, a computer-readable medium, and an apparatus are provided. The apparatus may be a network device (e.g., a BS or core network component). The network device may determine a self-interference measurement (SIM) configuration associated with null-forming at a wireless device, the null-forming associated with steering at least one receive beam of the wireless device and/or at least one transmit beam of the wireless device away from one or more external sources of self-interference, and may transmit, to the wireless device, an indication of the SIM configuration to facilitate at least one null-forming procedure at the wireless device.

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
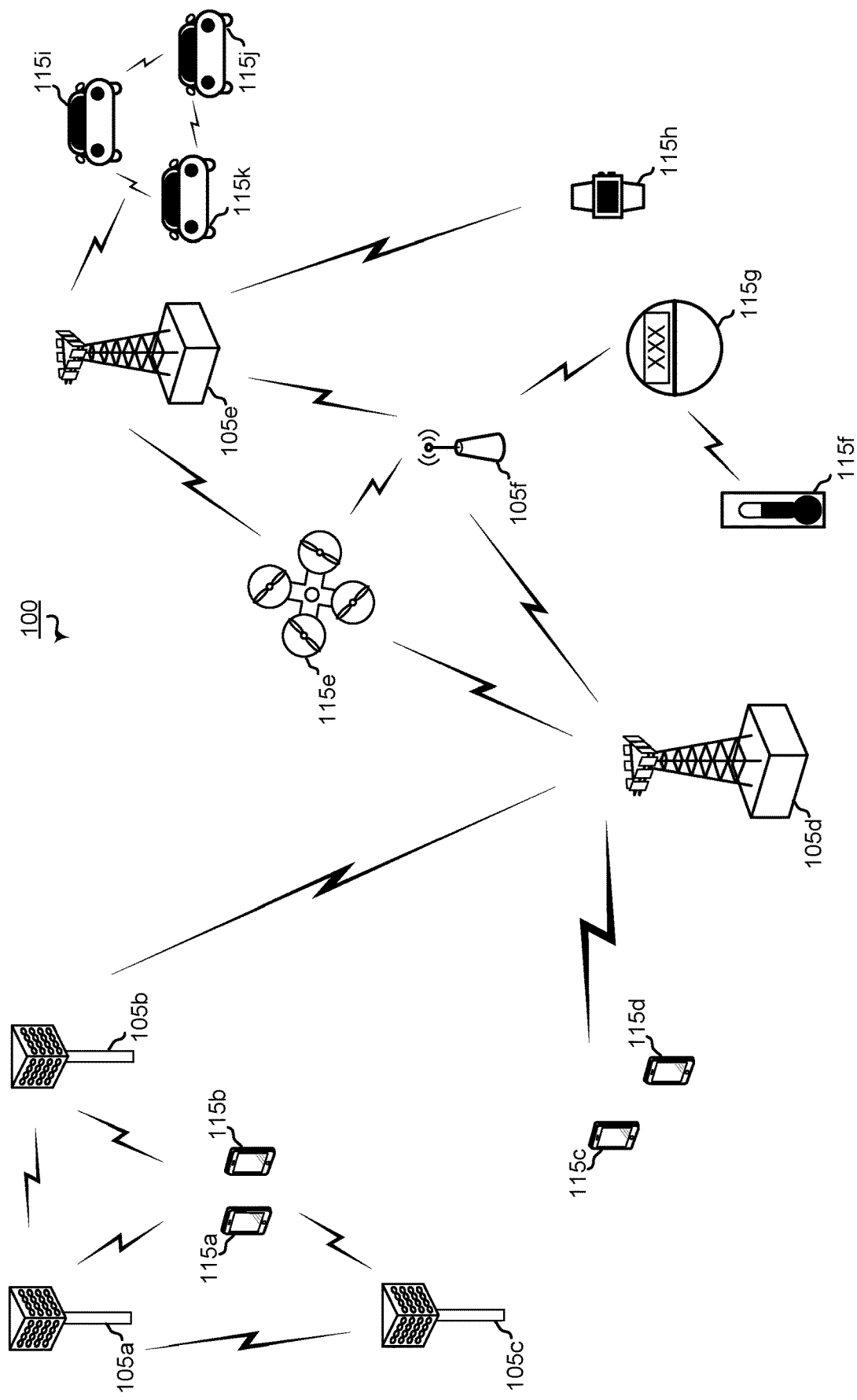
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS)

mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, some aspects of the present disclosure are concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip aspects and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some aspects. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise aspects of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the aspect illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of aspects supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
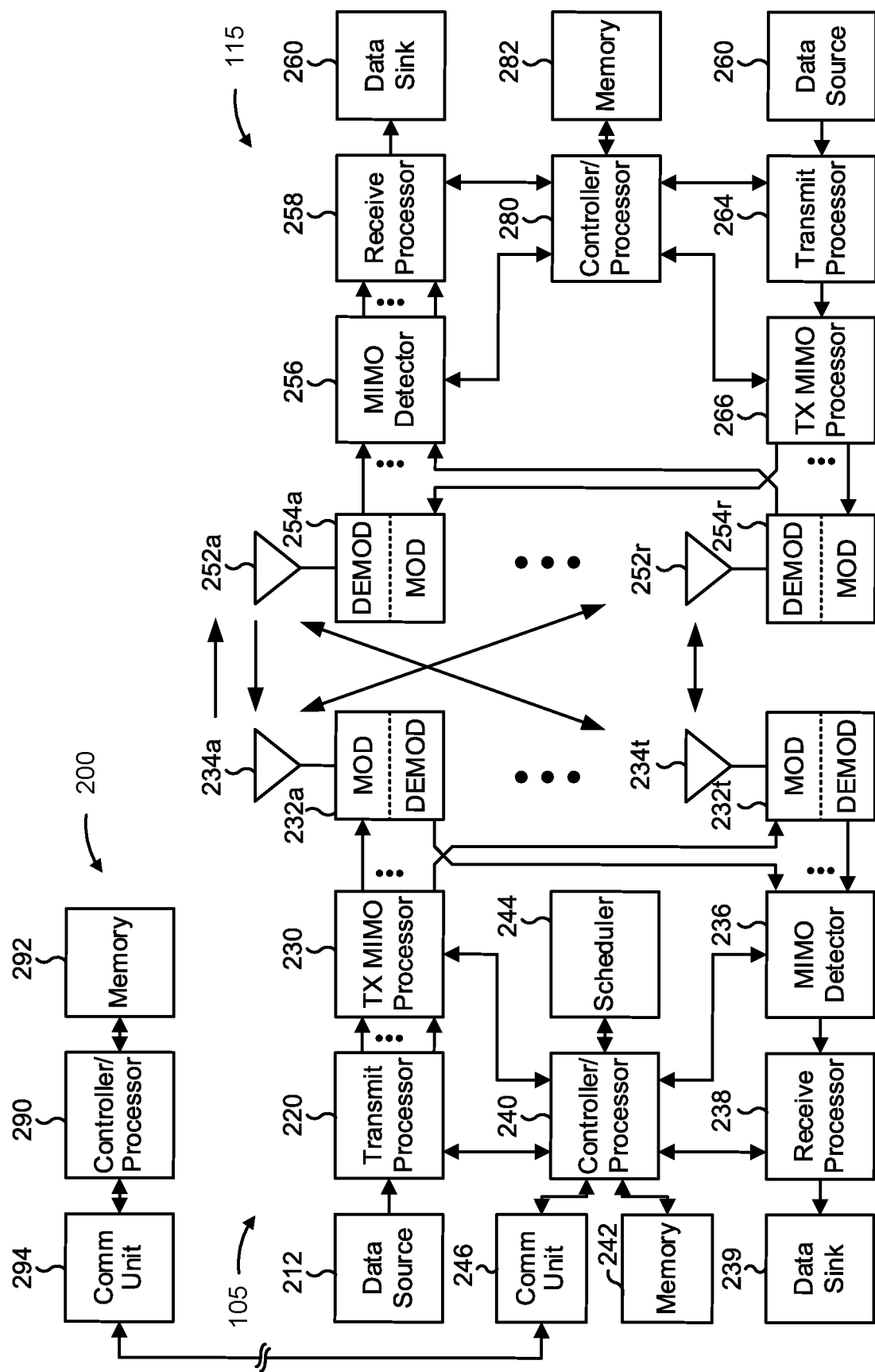
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively. Base station 105 may include communication unit 246 and communicate to network controller 200 (e.g., a RAN or core network component) via communication unit 246. Network controller 200 may include communication unit 294, controller/processor 290, and memory 292.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 5 and 6, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3B:
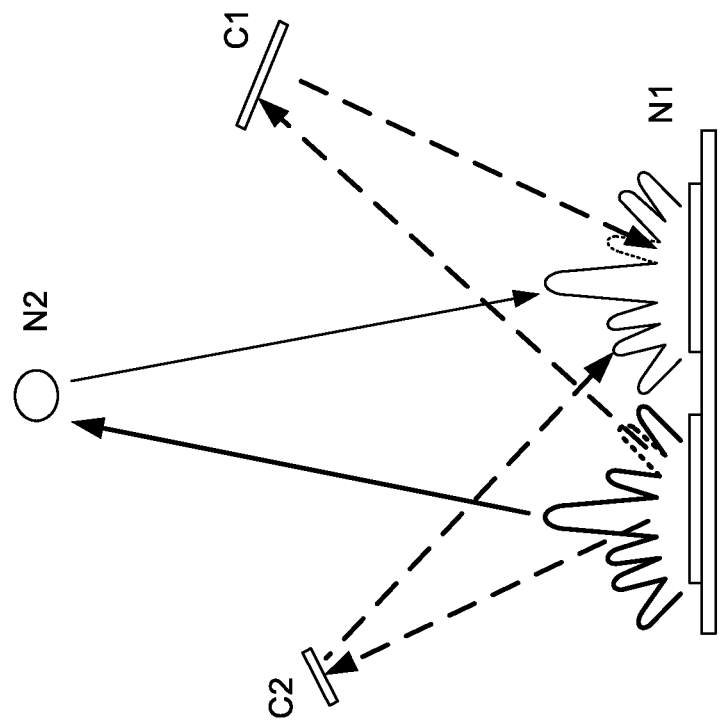
FIGS. 3A and 3B are diagrams illustrating examples of antenna arrays.
Figure 3A:
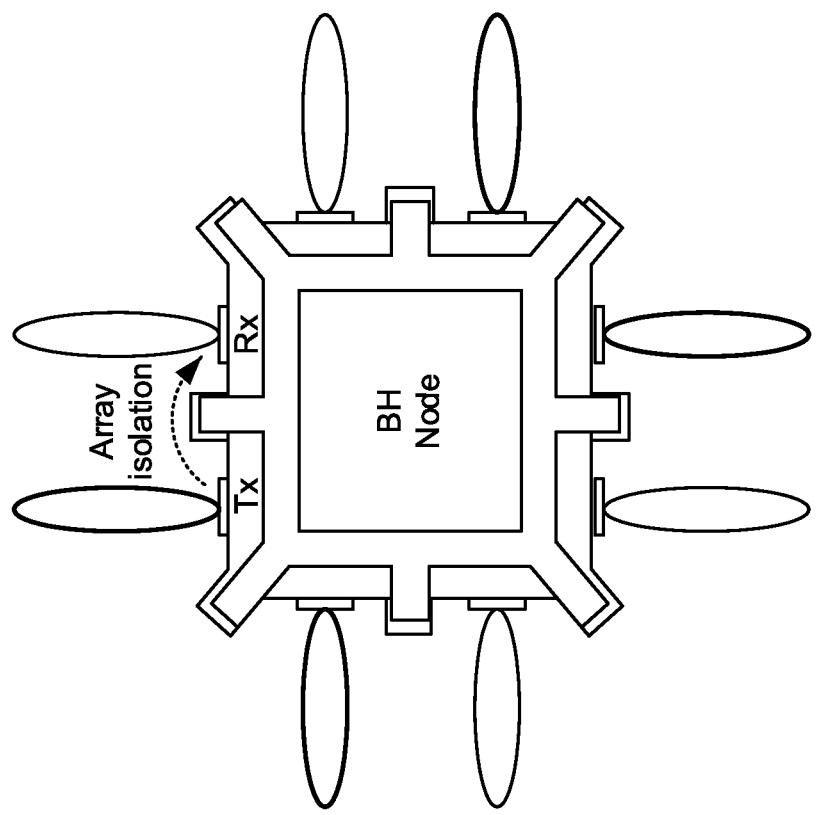

Referring to FIGS. 3A and 3B, examples of antenna arrays are illustrated. FIG. 3A corresponds to a diagram illustrating a complex antenna array. The antenna array may be suitable for mm wave communications, full duplex operations (e.g., simultaneous transmission and reception), or both. In the example of FIG. 3A, the antenna array has transmission (TX) and reception/receiving (RX) antenna panels or elements that are separated and isolated from each other. To illustrate, the antenna panels are spaced apart from each other and have structure blocking a transmission path between the two antenna panels. In some implementations and operating modes, a pair of TX and RX antenna panels/elements may simultaneously transmit and receive data, such as at least partially overlapping in time, frequency, or both.

FIG. 3B corresponds to a diagram illustrating simultaneous operation and clutter interference on one side of the antenna array of FIG. 3A. In FIG. 3B, the antenna elements of the TX and/or RX antenna panels form transmission nulls to reduce interference. Transmission nulls correspond to an intentional suppression of an antenna response in one or more particular directions, such as reduced, low, or no energy sidelobes. As illustrated in FIG. 3B, the antenna array of node N1 is operating in a full duplex mode with node N2. Outgoing and incoming transmissions have a particular main direction (e.g., spatial direction) or focus of radiative energy from the antennas. To produce such a main direction (e.g., spatial angle), the antenna panel also emits sidelobes or radiative energy in additional directions fanning out from the main direction. This sidelobe energy may cause interference. As shown in the example of FIG. 3B, the sidelobe energy or signals may reflect off of objects, such as C1 and C2. When reflected transmission sidelobe energy is directed back at the RX antenna panel, which is active to receive an RX transmission, the transmission sidelobe energy causes interference called clutter interference (or clutter echo). This reflected transmission energy may clutter, distort, or disguise incoming transmissions from node N2.

In conventional operations, such as sub mm wave operations and frequencies, clutter interference is not usually the biggest cause of self-interference (e.g., reduced SINR). Usually, array leakage is the largest contributor of self-interference. However, in mm wave operations and frequencies, array leakage (e.g., direct leakage) has been found to be lower and clutter interference (e.g., echo or indirect interference) has been found to cause a significant or majority amount of self-interference. For example, the size of the antenna elements for mm wave frequency and directional nature of the mm wave operations reduces array leakage. Reducing and mitigating clutter interference is a key challenge in enabling full duplex operating in mm wave. One proposed technique for reducing clutter interference involves measuring interference at one node, reporting the measured interference to another node, and making a determination based on the measurements. Such "closed loop" clutter interference mitigation techniques may be suitable for certain conditions and utilize additional processing and signaling overhead. Open loop clutter mitigation techniques have also been proposed.

Figure 4B:
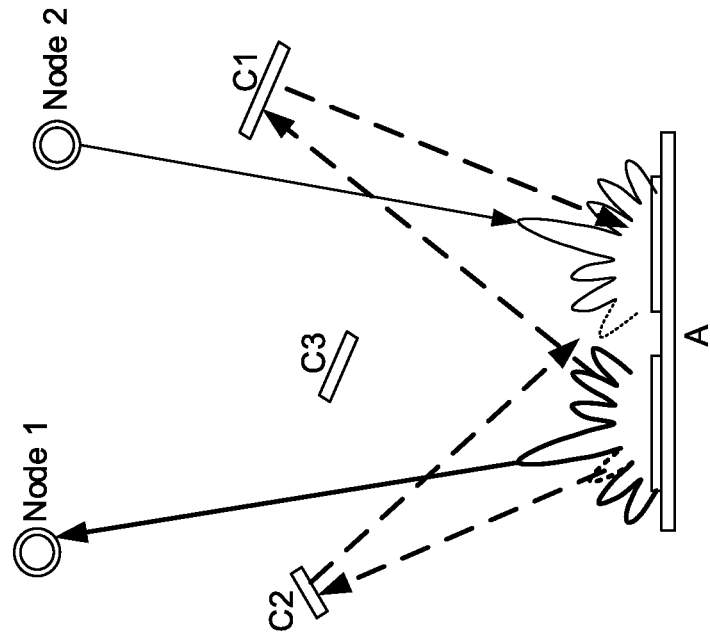
FIGS. 4A and 4B illustrate an example of transmission null sweeping.
Figure 4A:
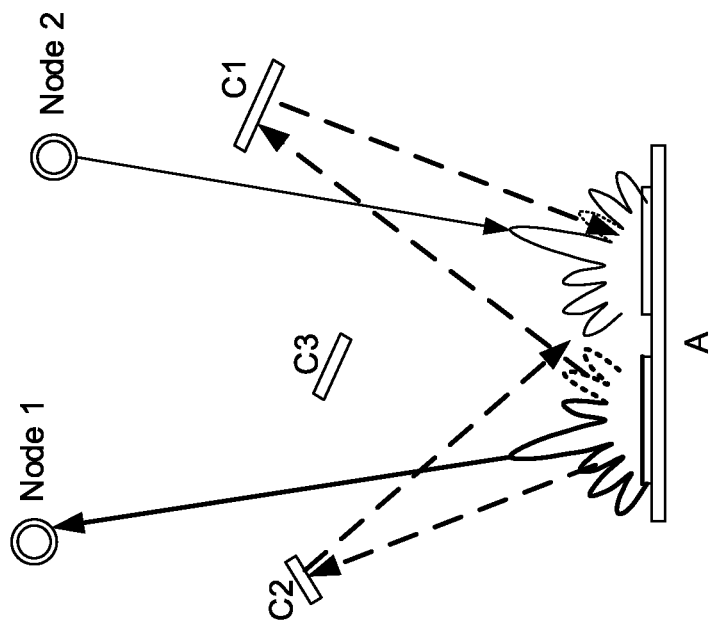

FIGS. 4A and 4B illustrate an example of transmission null sweeping. FIG. 4A illustrates a first transmission null and FIG. 4B illustrates a second and different transmission null. In FIG. 4A, the transmitting antenna generates a first transmission null that reduces or cancels clutter echo or feedback (clutter reflections) for object C1, such as reduces or cancels the generation of clutter reflections.

In FIG. 4B, the transmitting antenna generates a second transmission null that reduces or cancels clutter echo or feedback (clutter reflections) for object C2. As shown in FIGS. 4A and 4B, the receiving antenna may also form transmission nulls (e.g., reception nulls) in addition to or in the alternative of. In the examples shown in FIGS. 4A and 4B, the receiving antenna transmission nulls (e.g., reception nulls) also reduce or cancel the pickup of clutter reflections.

A radiation pattern (or antenna beam pattern) includes a main lobe, side lobes, and nulls. A null is a direction in a radiation pattern (or antenna beam pattern) where there is minimal transmitted or received power (e.g., between the lobes, as shown in FIGS. 4A-4B). In some designs, a wireless device may attempt to reduce or cancel self-interference by performing a number of transmissions via a transmit antenna while measuring a level of interference caused by the transmissions at a receive antenna, as discussed above with respect to FIGS. 4A-4B. Various null-forming procedures may be performed to align a null, including receive null-forming procedures (e.g., transmission beam is fixed and repeated, and multiple receive beams associated with a prior receive beam are used for measurements), transmit null-forming procedures (e.g., multiple transmit beams associated with a prior transmit beam are used, and receive beam is fixed and repeated), joint transmit and receive null-forming procedures (e.g., transmission and measurements over multiple self-interference (SI) resources with different choices of transmit and receive beams associated with, e.g., spatially QCL'd, with a pair of prior transmit and receive beams), or iterative null-forming procedures (e.g., start with a receive or transmit null-forming procedure, and then switch to the other null-forming procedure type, if needed). In other words, a transmit null may be tuned (or formed) so as to align with a receive lobe (e.g., main lobe or side lobe), a receive null may be tuned (or formed) so as to align with a transmit lobe (e.g., main lobe or side lobe), or both. Generally, the null-forming procedure(s) can be used to form null(s) to avoid interference (e.g., in this case, aligning a null with a self-interference source which may reduce or cancel out that interference, on the transmission-side, the reception-side, or both).

In some conventional wireless devices, as a baseline, for any beam, multiple spatially QCL'ed beams with different null-forming (e.g., suppression of different side-lobes and the amount of suppression) are pre-configured and stored at the wireless device. The wireless device has to go over the list and do measurements to find a good candidate. In some designs, multiple beams can be created on-the-fly and based on the prior measurements. In other designs, the wireless device may have performed prior measurements (e.g., detecting clutters, their directions and strengths), and may utilize this information to find/create a proper null-forming configuration.

Various parameters may be configured in null-forming procedures, such as transmit antenna beam pattern, receive beam pattern, number of transmission repetitions per beam, a signal type (e.g., SRS) and/or configuration (e.g., comb-2, comb-4, etc.), a transmission power level, a beam sweeping pattern, and so on. As used herein, any parameter related to a wireless device attempting to measure self-interference may be broadly characterized as part of a self-interference measurement (SIM) configuration. Wireless devices typically determine a SIM configuration independently, e.g., via a pre-stored SIM configuration or via an autonomous and dynamically configured (i.e., on the fly) SIM configuration. Because such SIM configurations are uncoordinated with other entities, the transmissions associated with conventional null-forming procedures cannot be used for other purposes (e.g., for positioning, for power control, etc.) and the SIM configuration used by a particular wireless device may be sub-optimal (e.g., the network may have knowledge that is not known to the wireless device which could be used to generate a SIM configuration that would better align or form the null so as to further reduce self-interference).

Aspects of the disclosure are directed to communicating a SIM configuration to a wireless device, in contrast to the wireless device implementing a pre-stored SIM configuration or its own autonomous and dynamically configured (i.e., on the fly) SIM configuration. Such an implementation may provide various technical advantages, including more precise null-forming, faster null-forming, network-coordinated null forming (e.g., so transmission part of null forming procedures can be monitored by other wireless entities, for positioning, power control, etc.), and so on.

Figure 5:
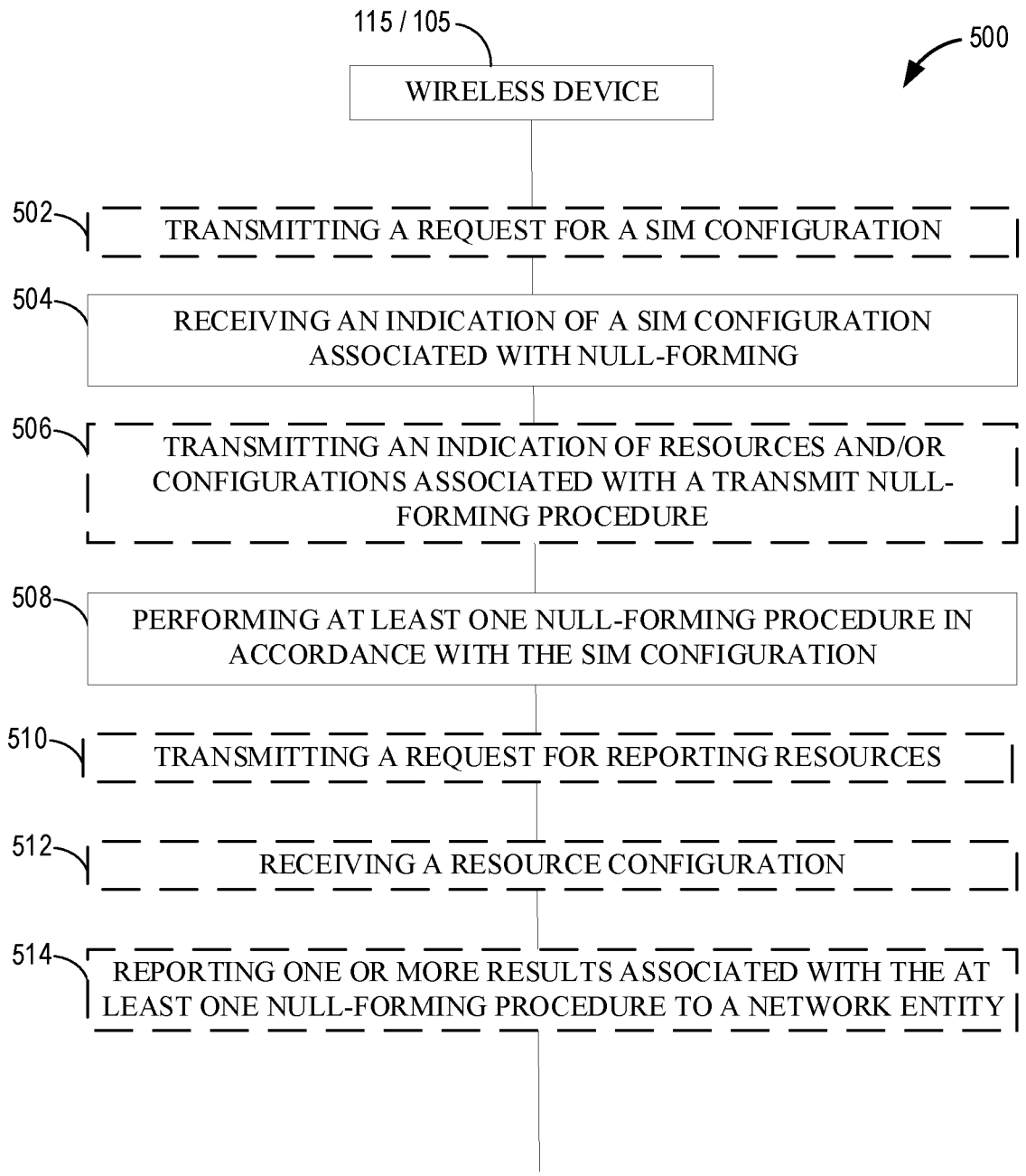
FIG. 5 illustrates an exemplary process of wireless communications according to an aspect of the disclosure.

FIG. 5 illustrates an exemplary process 500 of wireless communications according to an aspect of the disclosure. The process 500 of FIG. 5 is performed by a first wireless device, which may correspond to BS 105 or UE 115.

At 502, the first wireless device (e.g., antenna(s) 252a . . . 252r, modulators 254a . . . 254r, Tx MIMO processor 266, transmit processor 264, etc., or antenna(s) 234a . . . 234r, modulators 232a . . . 232r, Tx MIMO processor 230, transmit processor 220, controller/processor 240, etc.) optionally transmits to a network entity, a request for a self-interference measurement (SIM) configuration. In some designs, the transmission of 502 may be implemented via L1, L2 or L3 RRC signaling. In some designs, the transmission of 502 is optional because the network entity may instead push the SIM configuration to the UE 115 without an explicit request. In an example where the first wireless device corresponds to BS 105, the optional transmission may correspond to a backhaul communication to a separate network entity (e.g., core network component, etc.) or a transfer of data from one logical component of BS 105 to another logical component of BS 105 (e.g., internal inter-layer communication at BS 105). In an example, the request at 502 may specific certain desired attributes in the SIM configuration (e.g., a number of SIM resources needed depending on a number of transmit and/or receive beams in a respective null-forming codebook of the first wireless device, whether the SIM configuration should be associated with a transmit, receive, iterative or joint null-forming procedure, etc.).

At 504, the first wireless device (e.g., antenna(s) 252a . . . 252r, demodulators 254a . . . 254r, Rx MIMO processor 256, receive processor 258, etc., or antenna(s) 234a . . . 234r, demodulators 232a . . . 232r, Rx MIMO processor 236, receive processor 238, etc.) receives an indication of a SIM configuration associated with null-forming at the first wireless device, the null-forming associated with steering at least one receive beam of the first wireless device, at least one transmit beam of the first wireless device, or a combination thereof, away from one or more external sources of self-interference. In some designs, the received indication of the SIM configuration comprises an indication that the SIM configuration is associated with null-forming. In some designs, the SIM configuration specifies a transmit configuration for the at least one null-forming procedure, a receive configuration for the at least one null-forming procedure, or a combination thereof. In some designs, the SIM configuration instructs the first wireless device to perform a receive null-forming procedure, a transmit null-forming procedure, or a combination thereof. In some designs, the indication received at 504 includes the SIM configuration, while in other designs the indication received at 504 includes a reference to the SIM configuration (e.g., an index that triggers a SIM configuration lookup operation at the first wireless device). In an example where the first wireless device corresponds to BS 105, the reception at 504 may correspond to a backhaul communication from a separate network entity (e.g., core network component, etc.) or a transfer of data from one logical component of BS 105 to another logical component of BS 105 (e.g., internal inter-layer communication at BS 105). In some designs, the SIM configuration may specify a transmit configuration (e.g., resources to use for transmitted multiple signals, such as SRS resources in case of UL beamforming) and/or a receive configuration (e.g., resources and associated receive beamforming for measurements thereon).

At 506, in some designs, the at least one null-forming procedure may comprise a transmit null-forming procedure, which comprises transmitting a plurality of signals on a plurality of different transmit beams (e.g., where the plurality of different transmit beams are spatially QCL'ed), and measuring the plurality of signals on the same receive beam. In this case, one or more resources and/or configurations associated with the transmission of the plurality of signals may either be specified by the SIM configuration, or may be determined at the first wireless device independent of the SIM configuration. In a scenario where the one or more resources and/or configurations associated with the transmitting are determined at the first wireless device independent of the SIM configuration, at 506, the first wireless device (e.g., antenna(s) 252a . . . 252r, modulators 254a . . . 254r, Tx MIMO processor 266, transmit processor 264, etc., or antenna(s) 234a . . . 234r, modulators 232a . . . 232r, Tx MIMO processor 230, transmit processor 220, controller/processor 240, etc.) may optionally transmit an indication of at least one of the one or more resources or configurations associated with the transmission of the plurality of signals. As an example, this indication may coordinate the transmission of the plurality of signals with at least one other wireless device so that the other wireless device(s) can perform actions such as measuring the signal(s) (e.g., for power control, for positioning, etc.). Hence, a null-forming procedure need not be performed strictly for the purpose of null-forming, but can rather be opportunistically leveraged to facilitate other functions as well.

At 508, the first wireless device (e.g., antenna(s) 252*a* . . . 252*r*, demodulators 254*a* . . . 254*r*, Rx MIMO processor 256, receive processor 258, etc., or antenna(s) 234*a* . . . 234*r*, demodulators 232*a* . . . 232*r*, Rx MIMO processor 236, receive processor 238, etc., or antenna(s) 252*a* . . . 252*r*, modulators 254*a* . . . 254*r*, Tx MIMO processor 266, transmit processor 264, etc., or antenna(s) 234*a* . . . 234*r*, modulators 232*a* . . . 232*r*, Tx MIMO processor 230, transmit processor 220, controller/processor 240, etc.) performs at least one null-forming procedure in accordance with the SIM configuration. The at least one null-forming procedure may comprise a receive null-forming procedure, a transmit null-forming procedure, or a combination thereof (e.g., an iterative or joint receive/transmit null-forming procedure).

At 510, the first wireless device (e.g., antenna(s) 252*a* . . . 252*r*, modulators 254*a* . . . 254*r*, Tx MIMO processor 266, transmit processor 264, etc., or antenna(s) 234*a* . . . 234*r*, modulators 232*a* . . . 232*r*, Tx MIMO processor 230, transmit processor 220, controller/processor 240, etc.) optionally transmits a request to a network entity (e.g., gNB) to provide resources for reporting of result(s) associated with the at least one null-forming procedure. For example, the result(s) may comprise measurement information associated with the null-forming procedure(s), or a selected sidelobe or beam configuration based on the null-forming procedure(s). In some designs, the optional transmission at 510 is triggered periodically or semi-persistently, in response to a request from the network entity, in an event-triggered manner (e.g., the result(s) indicate a new beam configuration for the first wireless device, whether a good pair of transmit and receive beams were identified based on the null-forming procedure(s), etc.), or a combination thereof.

At 512, the first wireless device (e.g., antenna(s) 252*a* . . . 252*r*, demodulators 254*a* . . . 254*r*, Rx MIMO processor 256, receive processor 258, etc., or antenna(s) 234*a* . . . 234*r*, demodulators 232*a* . . . 232*r*, Rx MIMO processor 236, receive processor 238, etc.) optionally receives a resource configuration to be used for the reporting of the resources for reporting of result(s) associated with the at least one null-forming procedure. In some designs, the optional reception at 512 is triggered periodically or semi-persistently, in response to a request from the network entity, in an event-triggered manner (e.g., the result(s) indicate a new beam configuration for the first wireless device, etc.), or a combination thereof.

At 514, the first wireless device (e.g., antenna(s) 252*a* . . . 252*r*, modulators 254*a* . . . 254*r*, Tx MIMO processor 266, transmit processor 264, etc., or antenna(s) 234*a* . . . 234*r*, modulators 232*a* . . . 232*r*, Tx MIMO processor 230, transmit processor 220, controller/processor 240, etc.) optionally reports one or more results associated with the at least one null-forming procedure to a network entity. In some designs, the optional reporting at 514 is triggered periodically or semi-persistently, in response to a request from the network entity, in an event-triggered manner (e.g., the result(s) indicate a new beam configuration for the first wireless device, etc.), or a combination thereof. In some designs, the report at 514 may indicate the type of null-forming procedure(s) performed (e.g., transmit, receive, iterative, or joint null-forming procedure).

Figure 6:
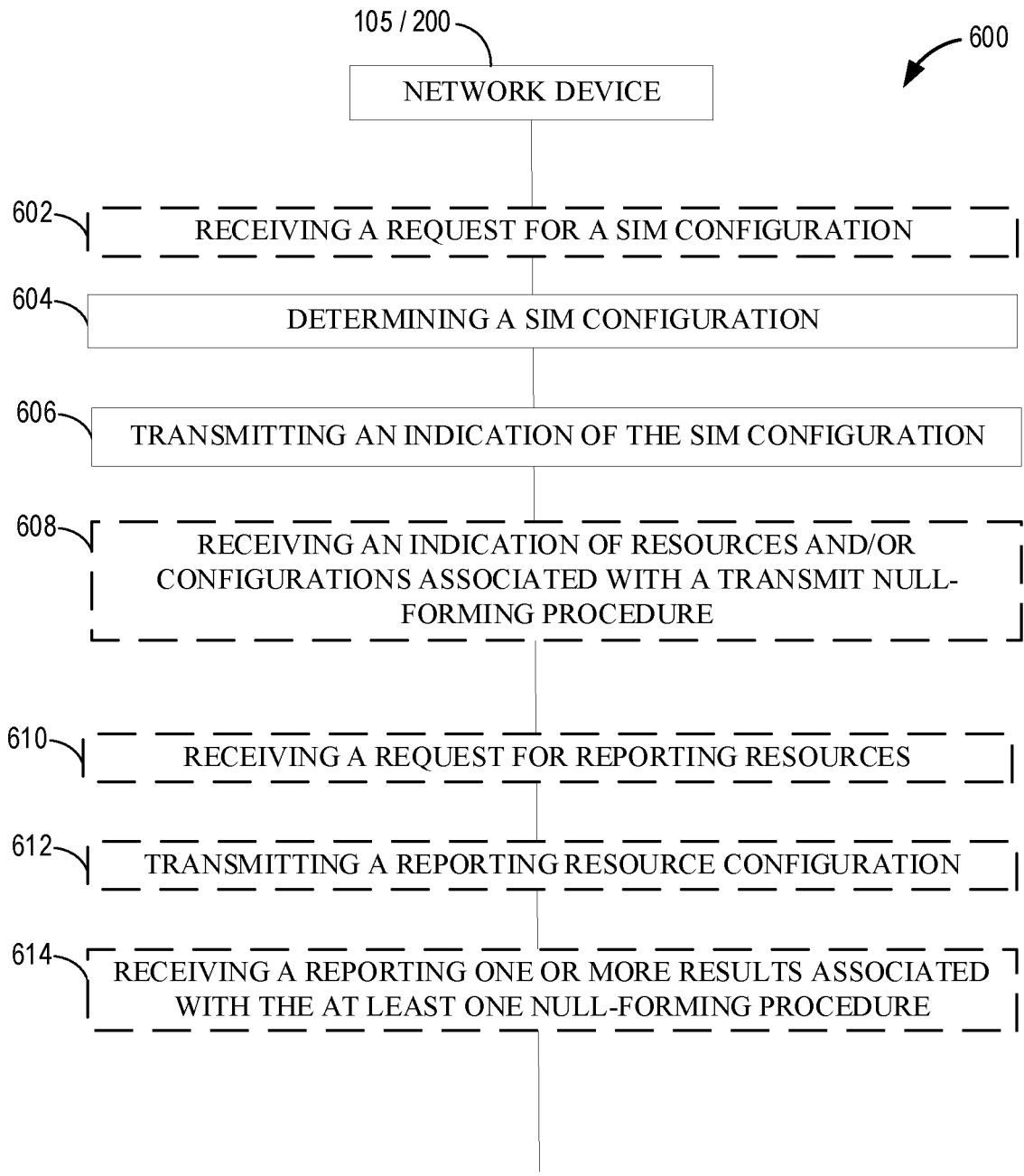
FIG. 6 illustrates an exemplary process of wireless communications according to an aspect of the disclosure.

FIG. 6 illustrates an exemplary process 600 of wireless communications according to an aspect of the disclosure. The process 600 of FIG. 6 is performed by a network device, which may correspond to BS 105 a separate network entity, such as network controller 130.

At 602, the network device (e.g., antenna(s) 252*a* . . . 252*r*, demodulators 254*a* . . . 254*r*, Rx MIMO processor 256, receive processor 258, etc., or antenna(s) 234*a* . . . 234*r*, demodulators 232*a* . . . 232*r*, Rx MIMO processor 236, receive processor 238, or communication unit 246, or controller/processor 240, or communication unit 294, etc.) optionally a request for a self-interference measurement (SIM) configuration. In some designs, the communication of 602 may be implemented via L1, L2 or L3 RRC signaling. In some designs, the transmission of 602 is optional because the network device may instead push the SIM configuration to the UE 115 without an explicit request. In an example where the network device corresponds to BS 105, the optional request may correspond to a backhaul communication to a separate network entity (e.g., core network component, such as network controller 200, etc.) or a transfer of data from one logical component of BS 105 to another logical component of BS 105 (e.g., internal inter-layer communication at BS 105). In an example, the request at 602 may specific certain desired attributes in the SIM configuration (e.g., a number of SIM resources needed depending on a number of transmit and/or receive beams in a respective null-forming codebook of the first wireless device, whether the SIM configuration should be associated with a transmit, receive, iterative or joint null-forming procedure, etc.).

At 604, the network device (e.g., controller/processor 240, controller/processor 290, etc.) determines a SIM configuration associated with null-forming at a first wireless device, the null-forming associated with steering at least one receive beam of the first wireless device, at least one transmit beam of the first wireless device, or a combination thereof, away from one or more external sources of self-interference. In some designs, the SIM configuration is configured to instruct the first wireless device to perform a receive null-forming procedure, a transmit null-forming procedure, or a combination thereof. In an example where the first wireless device corresponds to BS 105, the transmission at 604 may correspond to a backhaul communication from a separate network entity (e.g., core network component, such as network controller 200 etc.) or a transfer of data from one logical component of BS 105 to another logical component of BS 105 (e.g., internal inter-layer communication at BS 105). In some designs, the SIM configuration may specify a transmit configuration (e.g., resources to use for transmitted multiple signals, such as SRS resources in case of UL beamforming) and/or a receive configuration (e.g., resources and associated receive beamforming for measurements thereon).

At 606, the network device (e.g., antenna(s) 234*a* . . . 234*r*, modulators 232*a* . . . 232*r*, Tx MIMO processor 230, transmit processor 220, controller/processor 240, or communication unit 294, etc.) transmits, to the first wireless device, an indication of the SIM configuration to facilitate at least one null-forming procedure at the first wireless device. In some designs, the transmitted indication of the SIM configuration comprises an indication that the SIM configuration is associated with null-forming. In some designs, the SIM configuration specifies a transmit configuration for the at least one null-forming procedure, a receive configuration for the at least one null-forming procedure, or a combination thereof. In some designs, the indication transmitted at 606 includes the SIM configuration, while in other designs the indication transmitted at 606 includes a reference to the SIM configuration (e.g., an index that triggers a SIM configuration lookup operation at the first wireless device).

At 608, in some designs, the at least one null-forming procedure may comprise a transmit null-forming procedure, which comprises (at the first wireless device) transmitting a plurality of signals on a plurality of different transmit beams (e.g., where the plurality of different transmit beams are spatially QCL'ed), and measuring the plurality of signals on the same receive beam. In this case, one or more resources and/or configurations associated with the transmission of the plurality of signals may either be specified by the SIM configuration, or may be determined at the first wireless device independent of the SIM configuration. In a scenario where the one or more resources and/or configurations associated with the transmitting are determined at the first wireless device independent of the SIM configuration, at 608, the network device (e.g., antenna(s) 252a . . . 252r, demodulators 254a . . . 254r, Rx MIMO processor 256, receive processor 258, etc., or antenna(s) 234a . . . 234r, demodulators 232a . . . 232r, Rx MIMO processor 236, receive processor 238, or communication unit 246, or controller/processor 240, or communication unit 294, etc.) may optionally receive an indication of at least one of the one or more resources or configurations associated with the transmission (at the first wireless device) of the plurality of signals. As an example, this indication may coordinate the transmission of the plurality of signals with at least one other wireless device so that the other wireless device(s) can perform actions such as measuring the signal(s) (e.g., for power control, for positioning, etc.). Hence, a null-forming procedure need not be performed strictly for the purpose of null-forming, but can rather be opportunistically leveraged to facilitate other functions as well.

At 610, the network device (e.g., antenna(s) 252a . . . 252r, demodulators 254a . . . 254r, Rx MIMO processor 256, receive processor 258, etc., or antenna(s) 234a . . . 234r, demodulators 232a . . . 232r, Rx MIMO processor 236, receive processor 238, or communication unit 246, or controller/processor 240, or communication unit 294, etc.) optionally receives a request from the first wireless device to provide resources for reporting of result(s) associated with the at least one null-forming procedure. For example, the result(s) may comprise measurement information associated with the null-forming procedure(s), or a selected sidelobe or beam configuration based on the null-forming procedure(s). In some designs, the optional reception at 610 is triggered periodically or semi-persistently, in response to a request from the network entity, in an event-triggered manner (e.g., the result(s) indicate a new beam configuration for the first wireless device, whether a good pair of transmit and receive beams were identified based on the null-forming procedure(s), etc.), or a combination thereof.

At 612, the first wireless device (e.g., antenna(s) 234a . . . 234r, modulators 232a . . . 232r, Tx MIMO processor 230, transmit processor 220, controller/processor 240, or communication unit 294, etc.) optionally transmits a resource configuration to be used for the reporting of the resources for reporting of result(s) associated with the at least one null-forming procedure. In some designs, the optional transmission at 612 is triggered periodically or semi-persistently, in response to a request from the network entity, in an event-triggered manner (e.g., the result(s) indicate a new beam configuration for the first wireless device, etc.), or a combination thereof.

At 614, the network device (e.g., antenna(s) 252a . . . 252r, demodulators 254a . . . 254r, Rx MIMO processor 256, receive processor 258, etc., or antenna(s) 234a . . . 234r, demodulators 232a . . . 232r, Rx MIMO processor 236, receive processor 238, or communication unit 246, or controller/processor 240, or communication unit 294, etc.) optionally receives report(s) of one or more results associated with the at least one null-forming procedure. In some designs, the optional reception at 614 is triggered periodically or semi-persistently, in response to a request from the network entity, in an event-triggered manner (e.g., the result(s) indicate a new beam configuration for the first wireless device, etc.), or a combination thereof. In some designs, the report(s) at 614 may indicate the type of null-forming procedure(s) performed (e.g., transmit, receive, iterative, or joint null-forming procedure).

Referring to FIGS. 5-6, in some designs, as noted above, the at least one null-forming procedure may comprise a receive null-forming procedure. The receive null-forming procedure may comprise transmission, by the first wireless device, of a plurality of signals on the same transmit beam, and measuring, by the first wireless device, the plurality of signals on a plurality of different receive beams. In an example, the plurality of different receive beams may be spatially QCL'ed (e.g., QCL'd type D). In some designs, the SIM configuration may specify the number of transmission repetitions. In some designs, the SIM configuration may specify the spatial QCL'ed configuration for the plurality of different receive beams, while in other designs the first wireless device may independently determine the receive configuration for the plurality of different receive beams.

Referring to FIGS. 5-6, in some designs, as noted above, the at least one null-forming procedure may comprise a transmit null-forming procedure. The transmit null-forming procedure may comprise transmission, by the first wireless device, of a plurality of signals on a plurality of different transmit beams, and measuring, by the first wireless device, of the plurality of signals on the same receive beam. In an example, the plurality of different transmit beams may be spatially QCL'ed (e.g., QCL'd type D). In some designs, the SIM configuration may specify the resources associated with the plurality of different transmit beams (e.g., DL transmit beams, or UL transmit beams such as SRS), while in other designs the first wireless device may independently determine the transmit configuration for the plurality of different transmit beams.

Referring to FIGS. 5-6, in some designs, as noted above, the at least one null-forming procedure may comprise a transmit null-forming procedure and a receive null-forming procedure. In some designs, the transmit null-forming procedure and the receive null-forming procedure are performed iteratively (e.g., one after the other, with the latter null-forming procedure being conditionally performed based on one or more results from the first null-forming procedure). For example, if the initial null-forming procedure provides sufficient results, then another null-forming procedure may not be necessary. In other designs, the transmit null-forming procedure and the receive null-forming procedure are performed jointly (e.g., concurrently). In accordance with a joint null-forming procedure (e.g., transmission and measurements over multiple self-interference (SI) resources with different choices of transmit and receive beams associated with, e.g., spatially QCL'd, with a pair of prior transmit and receive beams).

Figure 7:
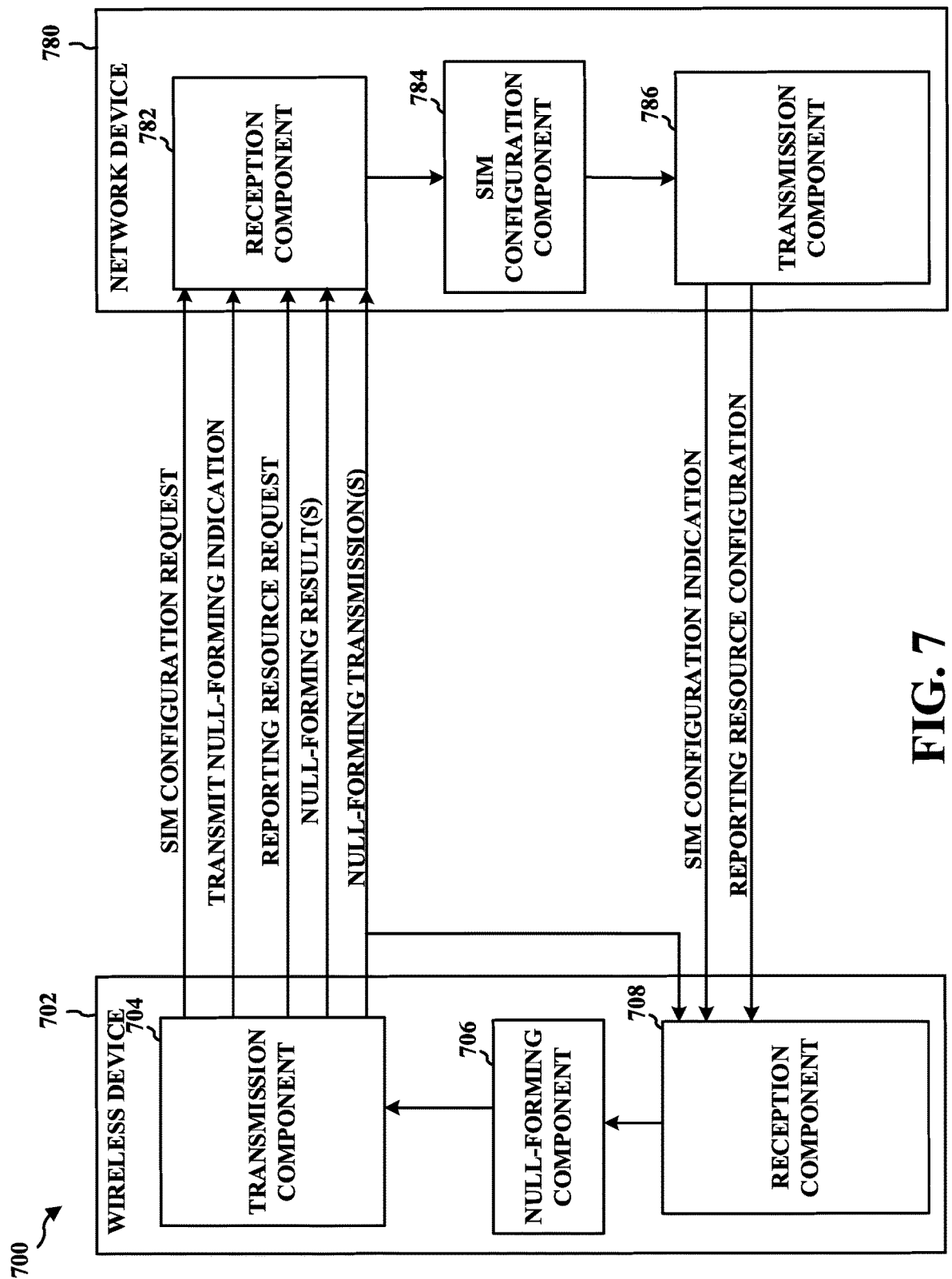
FIG. 7 is a conceptual data flow diagram illustrating the data flow between different means/components in exemplary apparatuses in accordance with an aspect of the disclosure.

FIG. 7 is a conceptual data flow diagram 700 illustrating the data flow between different means/components in exemplary apparatuses 702 and 780 in accordance with an aspect of the disclosure. The apparatus 702 may be a wireless device (e.g., BS 105 or UE 115) in communication with an apparatus 780, which may be a network device (e.g., BS 105, such as a different logical component of BS 105 in a scenario where the wireless device 702 corresponds to BS 105, or another network entity such as network controller 130).

The apparatus 702 includes a transmission component 704, which may correspond to transmitter circuitry in BS 105 or UE 115 as depicted in FIG. 2, including controller/processor 280, antenna(s) 252a . . . 252r, modulators(s) 254a . . . 254r, TX MIMO processor 266, TX processor 264, or antenna(s) 234a . . . 234r, modulators 232a . . . 232r, Tx MIMO processor 230, transmit processor 220, controller/processor 240, etc. The apparatus 702 further includes null-forming component 706, which may correspond to processor circuitry in BS 105 or UE 115 as depicted in FIG. 2, including controller/processor 240, controller/processor 280, etc. The apparatus 702 further includes a reception component 708, which may correspond to receiver circuitry in BS 105 or UE 115 as depicted in FIG. 2, including controller/processor 280, antenna(s) 252a . . . 252r, demodulators(s) 254a . . . 254r, MIMO detector 256, RX processor 258, or antenna(s) 234a . . . 234r, demodulators 232a . . . 232r, Rx MIMO processor 236, receive processor 238, etc.

The apparatus 780 includes a reception component 782, which may correspond to receiver circuitry in BS 105 or network device 130 as depicted in FIG. 2, including controller/processor 240, antenna(s) 234a . . . 234r, demodulators(s) 232a . . . 232r, MIMO detector 236, RX processor 238, communication unit 246, or communication unit 294. The apparatus 780 further includes a SIM configuration component 784, which may correspond to processor circuitry in BS 105 or network device 130 as depicted in FIG. 2, including controller/processor 240 or controller/processor 290. The apparatus 780 further includes a transmission component 786, which may correspond to transmission circuitry in BS 105 or network device 130 as depicted in FIG. 2, including e.g., controller/processor 240, antenna(s) 234a . . . 234r, modulators(s) 232a . . . 232r, Tx MIMO processor 230, TX processor 220, communication unit 246, or communication unit 294.

Referring to FIG. 7, the transmission component 704 optionally transmits a SIM configuration request to the reception component 782. The SIM configuration component 784 determines a SIM configuration, and the transmission component 786 transmits an indication of the SIM configuration to the reception component 708, which is relayed to the null-forming component 706. The null-forming component 706 optionally transmits a null-forming resource/configuration indication associated with a transmit null-forming procedure to the reception component 782 via the transmission component 704, and the apparatus 780 may optionally perform measurements based on the resource/configuration indication. The apparatus 780 may further optionally transmit a reporting resource request to the reception component 782, and the apparatus 780 may respond with a reporting resource configuration sent via the transmission component 786 to the reception component 708. The transmission component 704 may optionally transmit null-forming result(s) via the reporting resource configuration.

One or more components of the apparatus 702 and apparatus 780 may perform each of the blocks of the algorithm in the aforementioned flowcharts of FIGS. 5-6. As such, each block in the aforementioned flowcharts of FIGS. 5-6 may be performed by a component and the apparatus 702 and apparatus 780 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
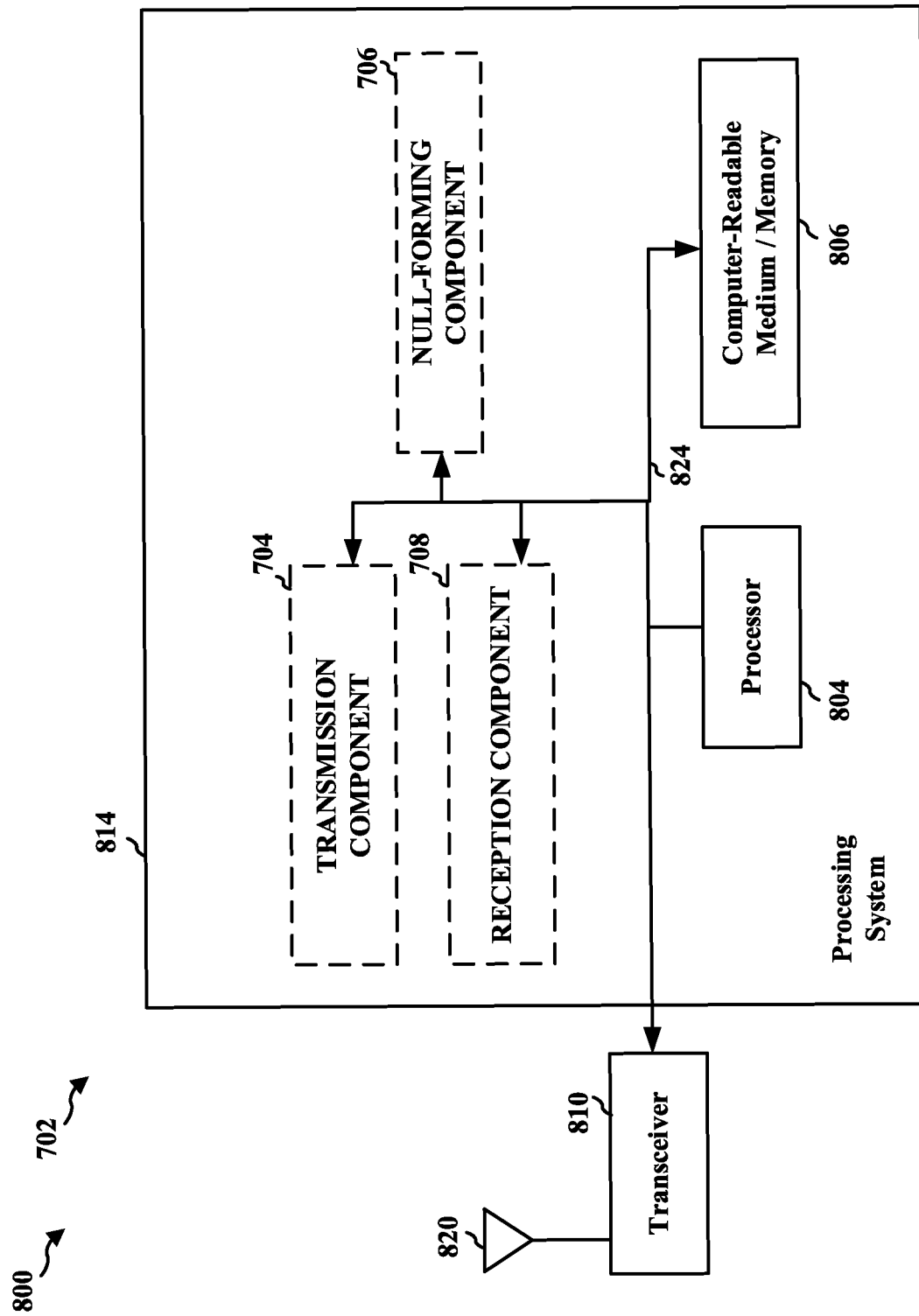
FIG. 8 is a diagram illustrating an example of a hardware implementation for an apparatus employing a processing system.

FIG. 8 is a diagram 800 illustrating an example of a hardware implementation for an apparatus 702 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706 and 708, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 708. In addition, the transceiver 810 receives information from the processing system 814, specifically the transmission component 704, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706 and 708. The components may be software components running in the processor 804, resident/stored in the computer readable medium/memory 806, one or more hardware components coupled to the processor 804, or some combination thereof. The processing system 814 may be a component of the BS 105 or UE 115 of FIG. 2 and may include the memory 242 or 282, and/or at least one of the TX processor 220 or 264, the RX processor 238 or 258, and the controller/processor 240 or 280.

In one configuration, the apparatus 702 (e.g., a UE or BS) for wireless communication includes means for receiving an indication of a self-interference measurement (SIM) configuration associated with null-forming at the first wireless device, the null-forming associated with steering at least one receive beam of the first wireless device, at least one transmit beam of the first wireless device, or a combination thereof, away from one or more external sources of self-interference, and means for performing at least one null-forming procedure in accordance with the SIM configuration.

The aforementioned means may be one or more of the aforementioned components of the apparatus 702 and/or the processing system 814 of the apparatus 702 configured to perform the functions recited by the aforementioned means. As described supra, the processing system 814 may include the memory 242 or 282, and/or at least one of the TX processor 220 or 264, the RX processor 238 or 258, and the controller/processor 240 or 280.

Figure 9:
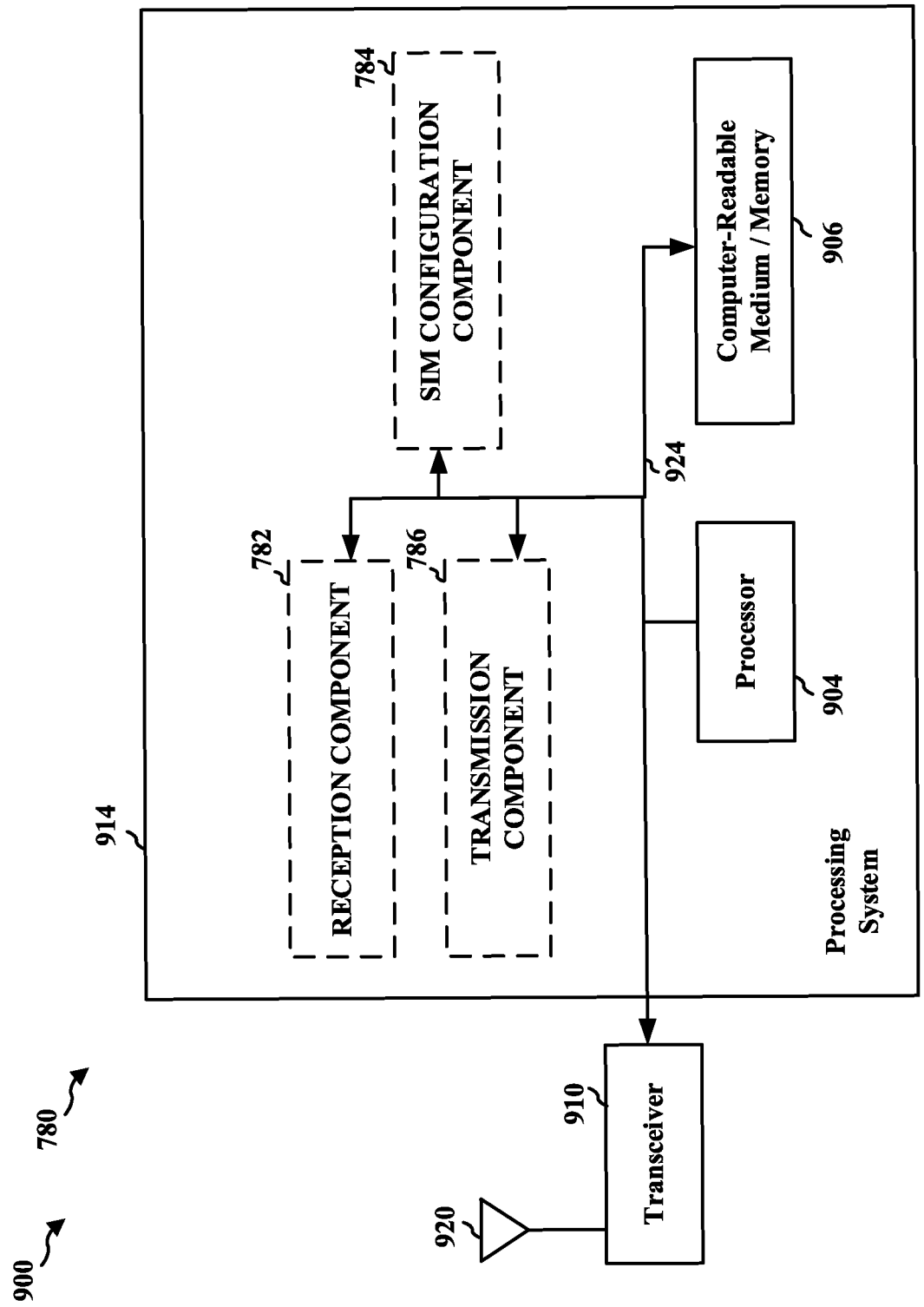
FIG. 9 is a diagram illustrating another example of a hardware implementation for an apparatus employing a processing system.

FIG. 9 is a diagram 900 illustrating an example of a hardware implementation for an apparatus 780 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 782, 784 and 786, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 782. In addition, the transceiver 910 receives information from the processing system 914, specifically the transmission component 786, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 782, 784 and 786. The components may be software components running in the processor 904, resident/stored in the computer readable medium/memory 906, one or more hardware components coupled to the processor 904, or some combination thereof. The processing system 914 may be a component of the BS 105 or network device 130 of FIG. 2 and may include the memory 242 or 292, and/or at least one of the TX processor 220, the RX processor 238, or the communication unit 294, and the controller/processor 240 or 290.

In one configuration, the apparatus 780 (e.g., a BS or core network device) includes means for determining a self-interference measurement (SIM) configuration associated with null-forming at a first wireless device, the null-forming associated with steering at least one receive beam of the first wireless device, at least one transmit beam of the first wireless device, or a combination thereof, away from one or more external sources of self-interference, and means for transmitting, to the first wireless device, an indication of the SIM configuration to facilitate at least one null-forming procedure at the first wireless device.

The aforementioned means may be one or more of the aforementioned components of the apparatus 780 and/or the processing system 914 of the apparatus 780 configured to perform the functions recited by the aforementioned means. As described supra, the processing system 914 may include the memory 242 or 292, and/or at least one of the TX processor 220, the RX processor 238, or the communication unit 294, and the controller/processor 240 or 290.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a first wireless device, comprising: receiving an indication of a self-interference measurement (SIM) configuration associated with null-forming at the first wireless device, the null-forming associated with steering at least one receive beam of the first wireless device, at least one transmit beam of the first wireless device, or a combination thereof, away from one or more external sources of self-interference; and performing at least one null-forming procedure in accordance with the SIM configuration.

Clause 2. The method of clause 1, wherein the first wireless device corresponds to a user equipment (UE).

Clause 3. The method of clause 2, wherein the receiving receives the indication from a base station.

Clause 4. The method of any of clauses 1 to 3, wherein the first wireless device corresponds to a base station.

Clause 5. The method of clause 4, wherein the receiving receives the indication from an external physical network component, or wherein the receiving receives the indication at a first logical component of the base station from a second logical component of the base station.

Clause 6. The method of any of clauses 1 to 5, wherein the at least one null-forming procedure comprises a receive null-forming procedure.

Clause 7. The method of clause 6, wherein the receive null-forming procedure comprises: transmitting a plurality of signals on the same transmit beam, and measuring the plurality of signals on a plurality of different receive beams.

Clause 8. The method of clause 7, wherein the plurality of different receive beams are spatially QCL'ed.

Clause 9. The method of any of clauses 1 to 8, wherein the at least one null-forming procedure comprises a transmit null-forming procedure.

Clause 10. The method of clause 9, wherein the transmit null-forming procedure comprises: transmitting a plurality of signals on a plurality of different transmit beams, and measuring the plurality of signals on the same receive beam.

Clause 11. The method of clause 10, wherein the plurality of different transmit beams are spatially QCL'ed.

Clause 12. The method of any of clauses 1 to 11, wherein the SIM configuration comprises an indication that the SIM configuration is associated with null-forming.

Clause 13. The method of any of clauses 1 to 12, wherein the at least one null-forming procedure comprises a transmit null-forming procedure and a receive null-forming procedure.

Clause 14. The method of clause 13, wherein the transmit null-forming procedure and the receive null-forming procedure are performed iteratively.

Clause 15. The method of any of clauses 13 to 14, wherein the transmit null-forming procedure and the receive null-forming procedure are performed jointly.

Clause 16. The method of any of clauses 13 to 15, wherein the SIM configuration specifies a transmit configuration for the at least one null-forming procedure, a receive configuration for the at least one null-forming procedure, or a combination thereof.

Clause 17. The method of any of clauses 1 to 16, further comprising: reporting one or more results associated with the at least one null-forming procedure to a network entity.

Clause 18. The method of any of clauses 1 to 17, further comprising: transmitting, to a network entity, a request for the SIM configuration, wherein the receiving receives the SIM configuration in response to the request.

Clause 19. A method of operating a network device, comprising: determining a self-interference measurement (SIM) configuration associated with null-forming at a first wireless device, the null-forming associated with steering at least one receive beam of the first wireless device, at least one transmit beam of the first wireless device, or a combination thereof, away from one or more external sources of self-interference; and transmitting, to the first wireless device, an indication of the SIM configuration to facilitate at least one null-forming procedure at the first wireless device.

Clause 20. The method of clause 19, wherein the first wireless device corresponds to a user equipment (UE) or a base station.

Clause 21. The method of any of clauses 19 to 20, wherein the network device corresponds to a base station.

Clause 22. The method of any of clauses 19 to 21, wherein the at least one null-forming procedure comprises a receive null-forming procedure.

Clause 23. The method of any of clauses 19 to 22, wherein the at least one null-forming procedure comprises a transmit null-forming procedure.

Clause 24. The method of any of clauses 19 to 23, wherein the SIM configuration comprises an indication that the SIM configuration is associated with null-forming.

Clause 25. The method of any of clauses 19 to 24, wherein the SIM configuration specifies a transmit configuration for the at least one null-forming procedure, a receive configuration for the at least one null-forming procedure, or a combination thereof.

Clause 26. The method of any of clauses 19 to 25, further comprising: receiving a reporting of one or more results associated with the at least one null-forming procedure.

Clause 27. The method of clause 26, wherein the reporting is triggered periodically or semi-persistently, in response to a request from a network entity, in an event-triggered manner, or a combination thereof.

Clause 28. The method of any of clauses 19 to 27, further comprising: receiving a request for the SIM configuration, wherein the transmitting transmits the SIM configuration in response to the request.

Clause 29. An apparatus comprising a memory, at least one transceiver, and at least one processor communicatively coupled to the memory and the at least one transceiver, the memory, the at least one transceiver, and the at least one processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Those of skill would further appreciate that the various illustrative logical blocks, modules, circuits, and algorithm steps (e.g., the logical blocks in FIGS. 5-6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of operating a first wireless device, comprising:
   receiving an indication of a self-interference measurement (SIM) configuration associated with null-forming at the first wireless device, the null-forming associated with steering at least one receive beam of the first wireless device, at least one transmit beam of the first wireless device, or a combination thereof, away from one or more external sources of self-interference; and
   performing at least one null-forming procedure in accordance with the SIM configuration.

2. The method of claim 1, wherein the first wireless device corresponds to a user equipment (UE).

3. The method of claim 2, wherein the indication is received from a base station.

4. The method of claim 1, wherein the first wireless device corresponds to a base station.

5. The method of claim 4,
   wherein the indication is received from an external physical network component, or
   wherein the indication is received at a first logical component of the base station from a second logical component of the base station.

6. The method of claim 1, wherein the at least one null-forming procedure comprises a receive null-forming procedure.

7. The method of claim 6, wherein the receive null-forming procedure comprises:
   transmitting a plurality of signals on the same transmit beam, and
   measuring the plurality of signals on a plurality of different receive beams.

8. The method of claim 7, wherein the plurality of different receive beams are spatially QCL'ed.

9. The method of claim 1, wherein the at least one null-forming procedure comprises a transmit null-forming procedure.

10. The method of claim 9, wherein the transmit null-forming procedure comprises:
    transmitting a plurality of signals on a plurality of different transmit beams, and
    measuring the plurality of signals on the same receive beam.

11. The method of claim 10, wherein the plurality of different transmit beams are spatially QCL'ed.

12. The method of claim 1, wherein the SIM configuration comprises an indication that the SIM configuration is associated with null-forming.

13. The method of claim 1, wherein the at least one null-forming procedure comprises a transmit null-forming procedure and a receive null-forming procedure.

14. The method of claim 13, wherein the transmit null-forming procedure and the receive null-forming procedure are performed iteratively.

15. The method of claim 13, wherein the transmit null-forming procedure and the receive null-forming procedure are performed jointly.

16. The method of claim 13, wherein the SIM configuration specifies a transmit configuration for the at least one null-forming procedure, a receive configuration for the at least one null-forming procedure, or a combination thereof.

17. The method of claim 1, further comprising:
    reporting one or more results associated with the at least one null-forming procedure to a network entity.

18. The method of claim 1, further comprising:
    transmitting, to a network entity, a request for the SIM configuration,
    wherein the SIM configuration is received in response to the request.

19. A method of operating a network device, comprising:
determining a self-interference measurement (SIM) configuration associated with null-forming at a first wireless device, the null-forming associated with steering at least one receive beam of the first wireless device, at least one transmit beam of the first wireless device, or a combination thereof, away from one or more external sources of self-interference; and
transmitting, to the first wireless device, an indication of the SIM configuration to facilitate at least one null-forming procedure at the first wireless device.

20. The method of claim 19, wherein the first wireless device corresponds to a user equipment (UE) or a base station.

21. The method of claim 19, wherein the network device corresponds to a base station.

22. The method of claim 19, wherein the at least one null-forming procedure comprises a receive null-forming procedure.

23. The method of claim 19, wherein the at least one null-forming procedure comprises a transmit null-forming procedure.

24. The method of claim 19, wherein the SIM configuration comprises an indication that the SIM configuration is associated with null-forming.

25. The method of claim 19, wherein the SIM configuration specifies a transmit configuration for the at least one null-forming procedure, a receive configuration for the at least one null-forming procedure, or a combination thereof.

26. The method of claim 19, further comprising:
receiving a reporting of one or more results associated with the at least one null-forming procedure.

27. The method of claim 26, wherein the reporting is triggered periodically or semi-persistently, in response to a request from a network entity, in an event-triggered manner, or a combination thereof.

28. The method of claim 19, further comprising:
receiving a request for the SIM configuration,
wherein the transmitting transmits the SIM configuration in response to the request.

29. A wireless device, comprising:
a memory; and
at least one processor coupled to the memory and configured to:
receive an indication of a self-interference measurement (SIM) configuration associated with null-forming at the wireless device, the null-forming associated with steering at least one receive beam of the wireless device, at least one transmit beam of the wireless device, or a combination thereof, away from one or more external sources of self-interference; and
perform at least one null-forming procedure in accordance with the SIM configuration.

30. A network device, comprising:
a memory; and
at least one processor coupled to the memory and configured to:
determine a self-interference measurement (SIM) configuration associated with null-forming at a wireless device, the null-forming associated with steering at least one receive beam of the wireless device and/or at least one transmit beam of the wireless device away from one or more external sources of self-interference; and
transmit, to the wireless device, an indication of the SIM configuration to facilitate at least one null-forming procedure at the wireless device.

* * * * *